establish the identity of the individual, no address or call number will be sent to the computer memory, but instead, a computer search circuit is activated so that the computer searches the electrical representations stored in computer memory 28 in order to retrieve those sets of electrical representations which correlate and match, within a reasonable degree of certainty, the electrical representations transduced by transducer 22. The sets of electrical representations thus retrieved would have appropriate call numbers or addresses in the computer memory which would correspond to individuals whose identity is known. Thus, the standard fingerprint comparison can be made between the fingerprints of the individual to be identified and the fingerprints of those individuals who have been matched by comparison of the transduced signals. In this way, the manual and visual comparison of a great number of fingerprints is obviated and comparison need only be made with a relatively small number of fingerprint sets.

Thus, it is seen that the apparatus and method of the present invention provide a rapid and accurate means to establish or verify the identity of an individual by linearly scanning a designated skin area of an individual and transducing electrical representations characteristic of distinguishing characteristics along the designated skin area in order that these electrical representations may be correlated and matched to a corresponding set of electrical representations of a known individual stored in a computer memory.

What is claimed is:

1. In an apparatus for establishing the identity of an individual, including means for detecting distinguishing characteristics of a designated skin area of an individual, means for transducing said distinguishing characteristics into electrical signals representative of said distinguishing characteristics and means for comparing said transduced electrical signals with a set of stored electrical signals known to be representative of the same designated skin area of the individual whose identity is to be verified, the improvement comprising:

- means associated with said transducing means to positively orient said designated skin area with a high degree of accuracy repeatedly to the same relative position within a plane parallel to and coincident with said transducing means and to minimize rotational movement of said designated skin area with respect to the proper alignment thereof within said fixed planar orientation thereby to repeatedly expose the same portion of said designated skin area corresponding to the characteristics of said stored electrical signals to said transducing means;
- said designated skin area being an area on an individual's hand;
- said means to positively orient said designated skin area includes a flat planar surface upon which an individual may place his hand palm down whereby said flat planar surface cooperates with said palm to minimize relative rotation of said designated skin area on said hand with and disposed to said planar surface, and a fixed positioning guide member extending from said flat planar surface to cooperate with a predetermined portion of said individual's hand thereby the planar positively orient said predetermined portion of said individual's hand and fix the relative position of said hand on said planar surface.

2. Apparatus as defined in claim 1 wherein said transducing means includes means to scan said designated skin area along a linear path and means to detect distinguishing characteristics of said designated skin area along said linear scan path.

3. Apparatus as defined in claim 2 wherein said means to detect said distinguishing characteristics includes a light source and a photoelectric cell, said cell being oriented along a vertical axis coincident with said linear scan path and said light source being spaced from said cell and disposed at an angle with respect to said vertical axis to direct a beam of light which intersects said vertical axis at a point in a plane coincident with the planar orientation of said designated skin area thereby to illuminate said ridges of said designated skin area and cause the formation of shadows in said valleys of said designated skin area whereby the image of said illuminated and shadowed areas are detected by said cell and are transduced by said transducing means into electrical signals representative of the distinguishing characteristics of said designated skin area.

4. Apparatus as defined in claim 2 wherein said transducing means further includes means to incrementally laterally displace said transducing means during each linear scan thereby to provide a plurality of discrete linear scan segments along said designated skin area with each successive scan segment being incrementally laterally spaced from the preceding scan segment thereby to eliminate errors due to slight lateral displacement of said designated skin area.

5. Apparatus as defined in claim 1 wherein said flat planar surface includes a longitudinal slot therein laterally spaced from said positioning guide member and oriented over said transducing means whereby when said individual places his hand on said planar surface against said positioning guide said designated skin area is exposed to said transducing means through said slot.

6. Apparatus as defined in claim 5 wherein said designated skin area is a skin area along a linear path on the palm side of a selected finger of said individual's hand and said positioning guide includes a flat plate member extending from said planar surface and adapted to fit between said selected finger and its next adjacent one with one side of said selected finger being pressed against the longitudinal face of said plate member thereby to orient said designated skin area on said finger within said slot.

7. Apparatus as defined in claim 6 wherein said designated skin area is a skin area along a linear path along the length of the middle finger of said individual's hand and said positioning guide further includes a resiliently urged pressure plate member adapted to engage the other side of said middle finger thereby to maintain said finger firmly against said plate member.

8. Apparatus as defined in claim 7 wherein said pressure plate member is pivotally secured to said flat plate member thereby to accommodate variations in the contour of a finger placed in said positioning guide to insure proper orientation of the designated linear scan on said finger with respect to said transducer.

9. A method for determining the identity of an individual by utilizing the distinguishing characteristics of a designated skin area along a linear path on the underside of a selected finger of an individual's hand comprising, fixing said individual's hand in a predetermined orientation with respect to a transducing apparatus, said step of fixing said individual's hand comprising placing said hand palm side down on a flat planar surface with the fingers of the hand extended thereby to preclude relative rotation of the selected finger of said hand and fixing the selected finger against a position plate extending from said planar surface to preclude misalignment of said selected finger, taking an initial linear scan with a photoelectric transducing means along said designated linear path and converting the response to said transducing into a set of electrical signals representative of said distinguishing characteristics, storing said set of electrical signals in a memory bank of a data processing system, repositioning said individual's hand in said predetermined orientation when saiindividual's identity is to be determined, taking a substantially identical linear scan of said individual's designated skin area, and transducing the impressions representative of the distinguishing characteristics of said individual into a set of electrical signals representative of said characteristics and comparing said second set of electrical signals with said first set stored in said memory bank in a computer thereby to determine the identity of said individual.

10. The method as defined in claim 9 wherein said linear scan is taken along the length of said selected finger of said hand and the distinguishing characteristics to establish the individual's identity include the ridges and valleys along the linear scan path of said finger as well as the difference in reflectivity from skin tone variations along said scan path.

INVENTOR.
MARTIN J. SLAVIN

BY

Blum, Moscovitz, Friedman & Kaplan
ATTORNEYS

INVENTOR.
MARTIN J. SLAVIN
BY
Blum, Moscovitz, Friedman & Kaplan
ATTORNEYS

INVENTOR.
MARTIN J. SLAVIN

BY

Blum, Moscovitz, Friedman & Kaplan
ATTORNEYS

INVENTOR.
MARTIN J. SLAVIN
BY
Blum, Moscovitz, Friedman & Kaplan
ATTORNEYS

ATTENDANT CONTROL PANEL SYSTEM

BACKGROUND OF THE INVENTION

This invention relates to control panels for controlling a plurality of utilization circuits. Modern passenger aircraft, ships and buildings generally incorporate a number of utilization circuits such as lights, heating and cooling systems, and entertainment systems. Wherever possible, it is common practice to try to bring as many of the controls for the utilization circuits in each airplane, ship or building to one or more locations so as to permit a minimum number of attendants to conveniently utilize a maximum number of utilization circuits.

For example, in a large multicompartmented aircraft, it would be preferable to provide a number of separate control panels scattered throughout the aircraft, each of which would be adapted to control the lighting throughout the aircraft and individual portions thereof as well as the heating and cooling system, the loudspeaker system, and other systems as desired. Most of such controls would be merely on/off switches which are utilized only a few times between each flight of the aircraft. Other utilization circuits which it would be desirable to control from a plurality of panels would be illuminated warning signs, the on/off control of the movie projector system common on commercial passenger aircraft and the projector focus control and audio volume control of said movie system. The latter two utilization circuits along with a brightness control on the lights involve adjustments over a continuous range rather than mere on/off functions.

In the known attendant control panel systems, all of the desired switch functions are hard wired from the rear of the panel to relay banks and other areas within the aircraft, ship or building. Such systems present substantial expense in terms of length of cable and labor required to install such cable. Further, severe bundling problems are present at the control panels and the relay panels in view of the large number of cables which must be brought to each location. Further, the large amount of cabling greatly increases the weight of the system, a factor of critical importance particularly in aircraft.

Still further disadvantages of the known control panel systems are their inflexibility and their susceptibility to tampering by unauthorized personnel. By their very nature, the known systems are difficult to modify or expand to accommodate additional utilization circuits due to the requirement for physical modification of the panel and the additional wiring involved. The controls of the known systems are readily accessible to unauthorized personnel and frequently, malicious or accidental tampering with such controls can result in damage to equipment and even endanger human life. By providing an attendant control panel system utilizing multiplexing techniques, the foregoing disadvantages are avoided.

SUMMARY OF THE INVENTION

Generally speaking, in accordance with the invention, an attendant control panel system for controlling a plurality of utilization circuits is provided which includes control means manually adjustable to a plurality of modes each representative of a particular utilization circuit to be controlled and the desired status thereof. Multiplexing means is connected to said control means for producing a multiplexed signal including in assigned time frames digital codes representative of the mode of said control means. Said multiplexing means is connected to a plurality of demultiplexing means, each of which is in turn connected to at least a portion of said utilization circuits. Each demultiplexing means received the multiplexed signal and upon detecting in an assigned time frame the digital codes assigned to its utilization circuits, places the appropriate utilization circuit in the status indicated by said control means. The latter function is preformed by detecting the digital code in said multiplexing signal representative of the desired status.

The system may include a plurality of control means each having a multiplexing means associated therewith, each of said multiplexing means being connected to all of said demultiplexing means. In such a embodiment, the plurality of multiplexing means would be synchronously operated to each produce its multiplexed signal during a separate assigned time period.

Tampering with the system may be prevented by providing authenticating means manually adjustable to a plurality of modes in said control means and authentication detecting means in said multiplexing means for detecting the mode of said authenticating means to permit the transmission of said multiplexed signal only if said detected authenticating means mode corresponds to at least a preselected one of said plurality of modes.

The control means may include a multiple digit keyboard and a zone selector switch means for establishing portions of said control means mode, the zone selector switch means being adapted to identify groups of utilization circuits the status of which are to be simultaneously controlled. Visual display means may also be provided for displaying the output of said multiple digit keyboard means as well as further switch means for selectively transmitting to said multiplexing means the mode of said control means represented at least in part by the mode of said visual display means.

Where a utilization circuit to be controlled is adjustable over a continuous range, the control means would include adjustment means variable over at least a corresponding range, the multiplexed signal produced by the demultiplexer means including in the assigned time frame a digital code representative of the setting of said adjustment means. Memory means are preferably included in the demultiplexer means for storing at least the portion of the last received multiplexed signal associated with each of its utilization circuits so that the demultiplexer means may control the status of its utilization circuits in response to the status of said memory means.

The control means may also display the status of certain utilization circuits and may be provided with status indication means for this purpose. In such a embodiment, the demultiplexing means would include detecting means for producing a digital code signal representative of the status of the utilization circuit the status of which is to be displayed, and transmitting means for transmitting to said multiplexer means said digital code signal in assigned time frames. The multiplexing means would include receiver means for detecting said digital code signal and operating said status indicating means in response thereto. The status of selected groups of utilization circuit may also be controlled by means of the attendant control panel system according to the invention.

Accordingly, it is an object of this invention to provide an attendant control panel system wherein a single control panel may operate a plurality of utilization circuits through branches of a single cable leading from said panel by means of multiplexing techniques.

Another object of the invention is to provide an attendant control panel system which is substantially immune from malicious or accidental tampering by unauthorized personnel.

A further object of the invention is to provide an attendant control panel system wherein a plurality of spaced panels may each control a plurality of widely dispersed utilization circuits.

Still another object of the invention is to provide an attendant control panel system adapted to display the status of selected utilization circuits as well as controlling the operation of these and other utilization circuits.

Another object of the invention is to provide an attendant control panel system adapted to perform not only on/off functions on the utilization circuits to be controlled, but also to adjust certain of said utilization circuits over a continuous range.

A further object of the invention is to provide an attendant control panel system wherein a single mode of the control panel thereof establishes the status of a plurality of utilization circuits.

Still other objects and advantages of the invention will in part be obvious and will in part be apparent from the specification.

The invention accordingly comprises the features of construction, combinations of elements, and arrangements of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
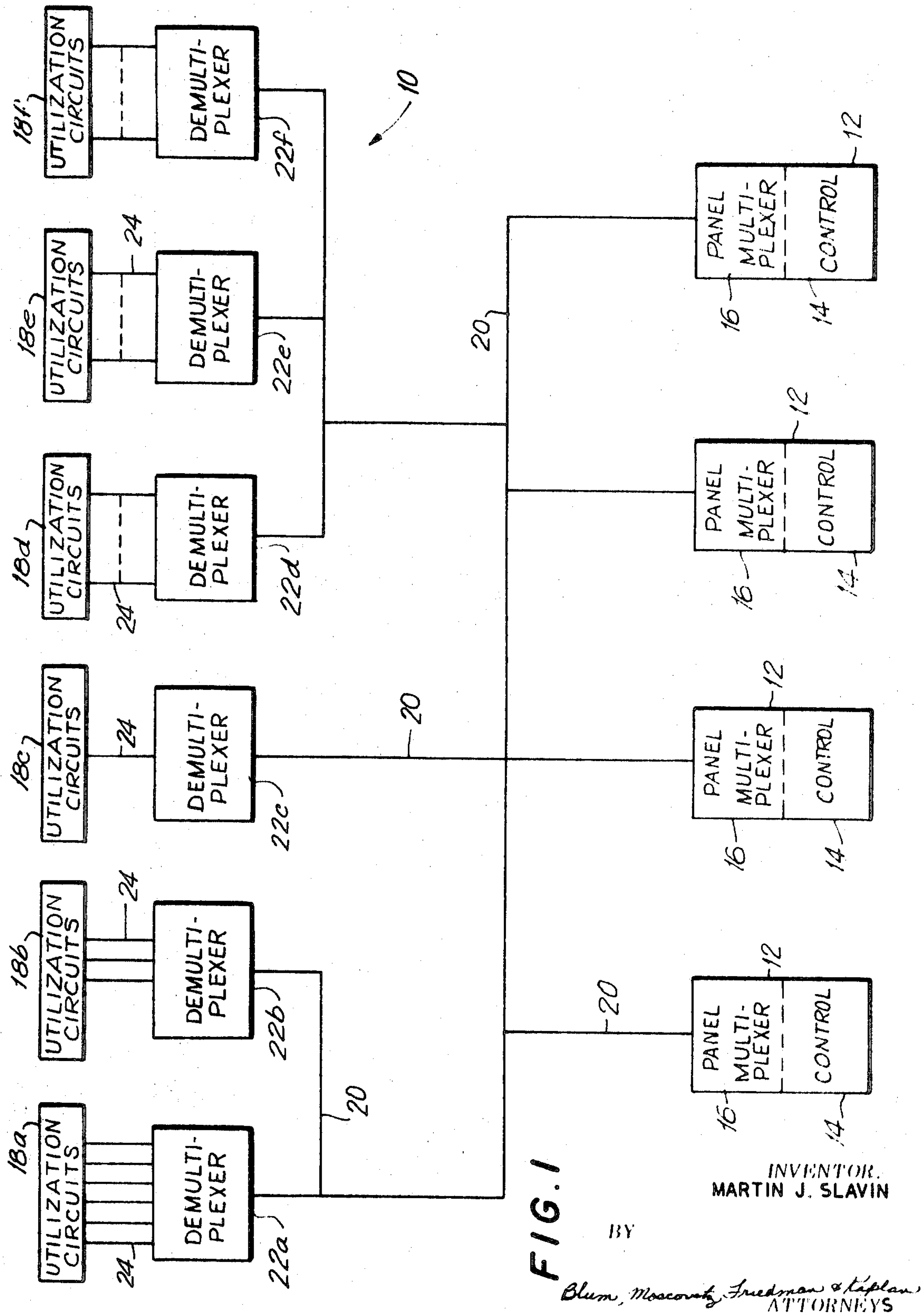
FIG. 1 is a block diagram of the attendant control panel system according to the invention.

Referring now to FIG. 1, the attendant control panel system 10 depicted includes four control panels 12 each including a control 14 and a multiplexer 16. Said panels would preferably be dispersed throughout the aircraft, ship, building or other installation to permit control from each panel of a plurality of utilization circuits 18*a–f*. Each panel 12 is connected to a branch of a common line 20 which in turn is connected through branches to a plurality of demultiplexers 22*a–f*. Each demultiplexer is connected through lines 24 to one or more corresponding utilization circuits. Thus, demultiplexer 22*a* is connected to six separate utilization circuits 18*a* while demultiplexer 22*c* is connected to and controls merely a single utilization circuit 18*c*. The number of panels 12, demultiplexers 22 and utilization circuits 18 depicted in FIG. 1 are shown by way of example and not by way of limitation.

In general terms, the system operates as follows. Control 14 is manually adjustable to a plurality of modes each representative of a particular one or group of utilization circuits to be controlled and the status thereof. The multiplexer 16 associated with each control 14 detects the mode of the control associated therewith and produces a multiplexed signal including in assigned time frames digital codes representative of the mode of said control. Each demultiplexer 22 receives said multiplexed signal and is adapted to detect in an assigned time frame thereof, the digital codes assigned to the utilization circuits associated therewith. Thus, the six utilization circuits 18*a* would each have a code assigned thereto and demultiplexer 22*a* would be adapted to detect at least those six codes. Upon detecting one of said digital codes, demultiplexer 22 then detects the digital code in the multiplexed signal representative of the desired status of the utilization circuit associated with said code and applies a signal along the pertinent line 24 to place said utilization circuit in the status indicated by said control means.

In the alternative, a number of codes can be assigned to each utilization circuit, each code being representative of both a particular utilization circuit and one of the statuses thereof. In such an embodiment, demultiplexers 22 would place the appropriate utilization circuit in the indicated status upon detecting a single code. In addition to controlling the operation of individual utilization circuits, particular groups of utilization circuits can be simultaneously controlled through the assignment of digital codes representative of further modes of control 14. In such case, the demultiplexers 22 associated with the utilization circuits 18 in the desired group would be adapted to place said utilization circuits in the status indicated by said control means upon detecting the appropriate digital code.

Figure 2:
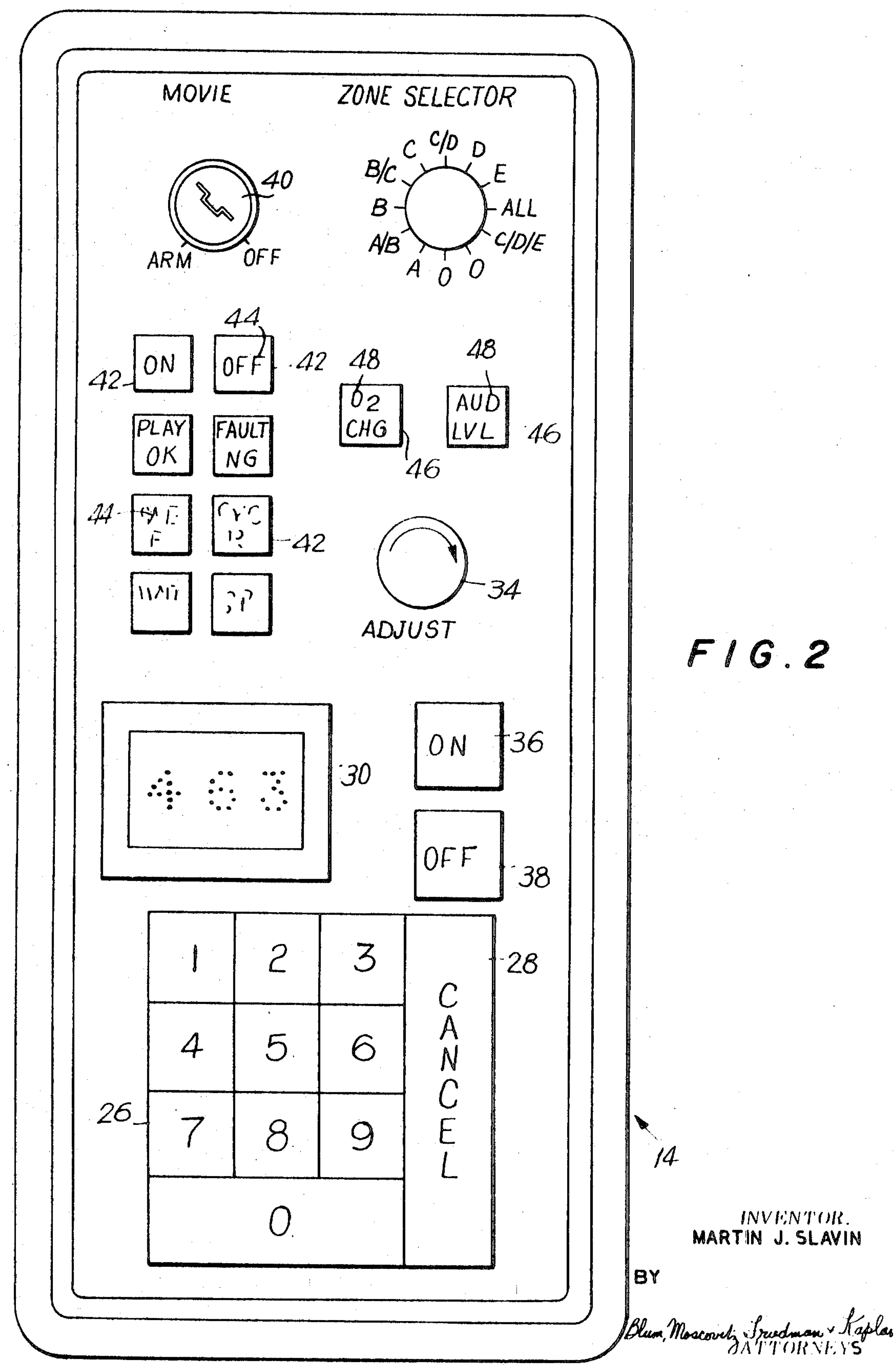
FIG. 2 is a front elevational view of one embodiment of a control panel of the system of FIG. 1.

Further features of the arrangement according to the arrangement can be understood in connection with an examination of FIG. 2 which depicts one embodiment of a control 14 according to the invention. The term "mode" of said control, as used herein, refers to the setting of the various controls on control panel 14. Thus, in the particular embodiment depicted, the control is provided with a 10–digit keyboard 26 of conventional design which also includes a "cancel" key 28 also of conventional design. The numerical code set by keyboard 26 is displayed in visual display 30, also of a conventional design. By means of keyboard 26, the operator may set a portion of the mode of control 14 as represented by the number displayed in numerical display 30. Each such number would be associated with a particular utilization circuit or group of utilization circuits and the status thereof. For example, one of the codes could be associated with turning on the cooling system utilization circuit.

Keyboard 26 also serves the further purpose of providing a means to prevent unauthorized activation of the panel system. Accordingly, panel 12 is adapted to be operative only when a particular code is first applied thereto by means of keyboard 26. In effect, such initial code serves as a key to unlock the system, and permit the further use thereof. When the system incorporates such an authentication arrangement, the mode set in control 14 will not be transmitted as a multiplexed signal by multiplexer 16 unless the proper authorization code is first applied to keyboard 26.

A further element of the mode of control 14 is represented by zone selector switch 32. Said switch permits the simultaneous control of a group of utilization circuits located in one or more areas or zones. For example, in a multicompartmented aircraft, each compartment might be considered a zone, and switch 32 would be adapted to permit the simultaneous control of all of a like type of utilization circuits located in any one compartment or any combination of said compartments. A zone may also consist of a group of different, widely scattered utilization circuits to be operated as a unit under certain circumstances. Thus, all of the lights in a particular compartment could be turned on by setting zone selector switch 32 to that particular compartment and imparting the code on keyboard 26 associated with turning lights on. Zone selector switch 32 may be dispensed with, if desired, and a separate code to be imparted on keyboard 26 can be assigned to each desired combination of utilization circuits to be simultaneously controlled. For example, a single code could direct the demultiplexers to adjust the lights, sound system and cooling system of an aircraft to assume the particular configuration utilized during boarding, or during the showing of a movie.

Also forming a part of the mode of control 14 is adjustment control 34. Rather than being a multiposition switch such as zone selector switch 32, adjustment control 34 is adjustable over a continuous range and is preferably connected to the wiper arm of a rheostat. Adjustment control 34 is utilized to set utilization circuits which are, themselves, adjustable over a continuous range such as the intensity control on lamps, and audio volume and video focusing controls. Such utilization circuits may be adjusted by setting a code representative thereof on keyboard 26 and setting adjustment control 34 to the desired position. "On" button 36 is provided to direct multiplexer 16 to transmit a multiplexed signal representative of the mode of control 14 to demultiplexers 22 after the operator has established said mode by setting the various controls. An "off" button 38 is provided to direct said multiplexer to stop transmission.

Key lock 40 may be provided as a further authentication control for a particular function such as the turning on of a movie projector. The demultiplexer would be adapted not to produce a multiplexed signal representative of the command to turn on the movie unless key lock 40 were operated.

Control 14 also includes an array of indicator lights 42 each of which includes an information imparting indicia 44 thereon. Said indicator lights are representative of the status of particular utilization circuits and provide a continuous indication of said status. In order to provide this feature of the arrangement according to the invention, certain of the demultiplexers 22, in particular, those demultiplexers associated with utilization circuits the status of which are to be detected, are adapted to detect such utilization circuits' status, produce a digital code signal representative of said status and transmit said digital code signal to multiplexers 16 in assigned time frames. Multiplexers 16 are adapted to receive said digital code signal and to activate indicating lights 42 in response thereto.

Still a further feature of the arrangement according to the invention is represented by indicator lights 46 having information imparting indicia 48 thereon, said indicator lights being of variable intensity. To operate indicator lights 46, the digital code signal transmitted by the pertinent demultiplexers would be representative not merely of an on/off indication, but of the quantitative value being monitored, said quantitative digital code being utilized to set the intensity of indicating lights 46. The latter arrangement would be utilized for indication of audio level, water level, oxygen pressure, and the like. Numerical display 30 can also be utilized to display status data transmitted by the demultiplexers, either as a code representative of status or as a quantitative reading of the status of the utilization circuit being monitored. In such an embodiment, an activation code could be set on control panel 14 by keyboard 26. When said activation code is detected by the pertinent demultiplexer, said demultiplexer transmits, during the approximate time frame, a digital code signal representative of utilization circuit status to the multiplexer. The multiplexer then activate s numerical display 30 to provide the required status indication.

The attendant control panel system according to the invention utilizes multiplexing techniques to provide a flexible system requiring a minimum of intercomponent wiring. In particular, the system according to the invention utilizes a time division multiplexing technique wherein one cycle of the system is divided into a plurality of time periods each of which is assigned to one of the multiplexers 16. Each of said multiplexers transmits its multiplexed signal representative of the mode of the control panel 14 associated therewith during a separate time period so that the signal from only one multiplexer is being transmitted at any instant. Each time period is itself divided into a number of time frames. Each of said time frame is assigned a particular function and the digital data present during said frame is representative of that function. Each frame would be of a duration sufficient to transmit a predetermined number of bits of information. For example, in one embodiment of the arrangement according to the invention, each time period would include a time frame assigned to the transmission of a synchronization signal, a time frame assigned to the transmission of a digital code representative of the setting of zone selector switch 32, a time frame assigned to each digit of the code set by keyboard 26, a time frame set aside for the transmission of digital data representative of the setting of adjustment control 34 and a time frame set aside for the transmission from demultiplexers 22 of digital data representative of the status of the utilization circuits being examined for the purpose of activating the various indicator lights 42 and 46, or numerical display 30 of control panel 14.

Figure 3:
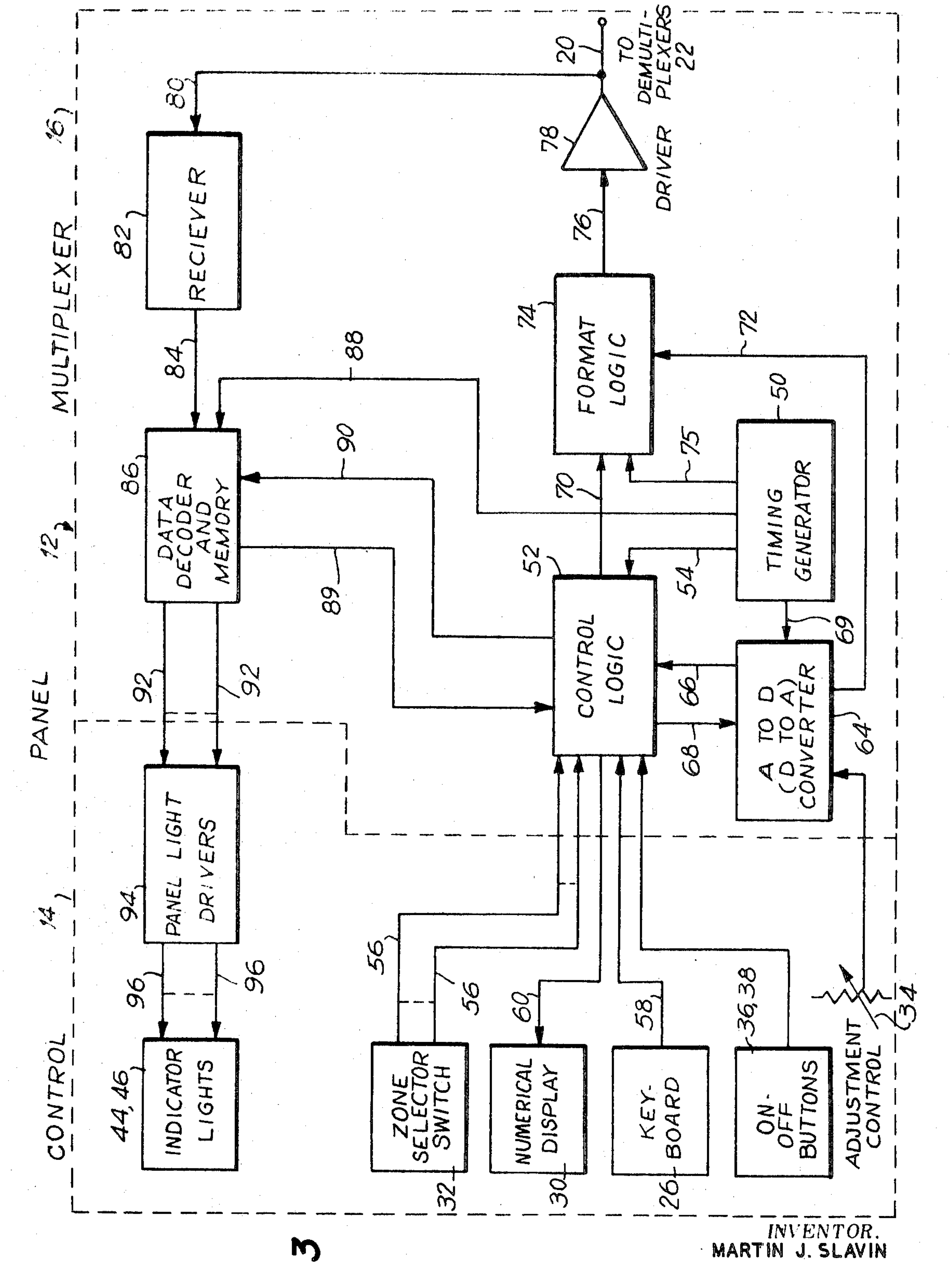
FIG. 3 is a block diagram of the panel multiplexer of the system of FIG. 1.

Reference is now had to FIG. 3 of the drawings wherein a detailed block diagram of one embodiment of the panel 12 according to the invention is shown. Turning first to multiplexer 16 of said panel, said multiplexer includes a timing generator 50 which provides basic timing signals to the other components thereof to insure the synchronous operation essential for multiplexing systems. The operation of multiplexer 16 is governed by control logic 52 which in turn is governed by timing signals received along line 54 from timing generator 50. Said control logic operates to detect the "mode" of control 14, to transmit such "mode" to the appropriate components of multiplexer 16 for the generation of the digital code signal representative of said mode and for the sequencing of said components to transmit said code.

For the purposes of mode detection, zone selector switch 32 is connected with control logic 52 by lines 56, Keyboard 26, and numerical display 30 are connected by lines 58 and 60 respectively to said control logic. The control logic, upon receiving a multidigit code from keyboard 26, drives through line 60 to display said code on said numerical display. Line 60 would also be utilized to transmit quantitative status data transmitted by the demultiplexers to the numerical display. Adjustment control 34 is connected through line 62 to analog-to-digital converter 64 which converts the analog signal represented by the setting of said adjustment control to a digital code. Said analog-to-digital converter is connected by lines 66 and 68 to control logic 52 for control and the transmission of status data as more particularly described below and by line 69 to timing generator 50 for sequencing.

The mode data imparted by zone selector switch 32, keyboard 26 and adjustment control 34 is stored in multiplexer 16 until the transmission of the multiplexed signal is directed by depression of "on" button 36 connected to control logic 52 by line 61. At that time, the signals representative of the mode of control 14 are transmitted by control logic 52 and analog-to-digital converter 64 along lines 70 and 72 respectively to format logic 74 which assembles the multiplexed signal representative of said detected mode with the appropriate digital data in the appropriate time frames. Said format logic transmits the multiplexed signal along line 76 to driver 78 which, in turn, transmits said signal to line 20 which is connected to all of the demultiplexers 22. Each multiplexer 16 operates in substantially the same manner, with the exception that each control logic would be adapted to insure that the multiplexed signal is transmitted only during the time period assigned to that multiplexer.

Line 80 taps off line 20 to transmit the multiplexed signals present in line 20 to receiver 82. Said receiver is connected by line 84 to data decoder and memory 86 which is adapted to detect in the assigned time frame the digital data representative of the status of the particular utilization circuits being monitored by indicator lights 44 and 46. The operation of said data decoder and memory is controlled by signals from timing generator 50 and control logic 52 passed along lines 88 and 90 respectively. The memory portion thereof, which would preferably consist of both core and flip-flop memory, stores the detected status data, and circuitry is provided therein to prevent the loss of such stored information during power transients so that the indicator lights immediately provide an indication of the last detected status of the utilization circuits in question after the resumption of power.

A digital-to-analog converter may be incorporated within the data decoder portion thereof for the operation of variable intensity indicator lights 46. However, analog-to-digital converter 64 can function as a digital-to-analog converter. In such an embodiment, the digital signals from data decoder and memory 86 would be transmitted to analog to digital converter 64 through lines 89 and 68 and control logic 52 and the converter analog signal would be returned through lines 66 and 90 and said control logic. Control logic 52 need not be included in said connections or, if desired, the control logic can be adapted to use the digital data signal to drive numerical display 30 to display the quantitative data. The output of data decoder and memory 86 is taken at lines 92 which are connected to panel light drivers 94, which drive indicator lights 44 and 46 through lines 96.

In order to improve the accuracy of the system according to the invention, format logic 74 can be adapted to add error detecting and correcting codes to the digital data to provide considerable improvement in data transmission and noise immunity. Further, redundant cabling using majority logic can be utilized to protect the system from breaks in any single line. Even with such redundant cabling the system according to the invention would require substantially less cabling than the known hard wires arrangements.

Figure 4:
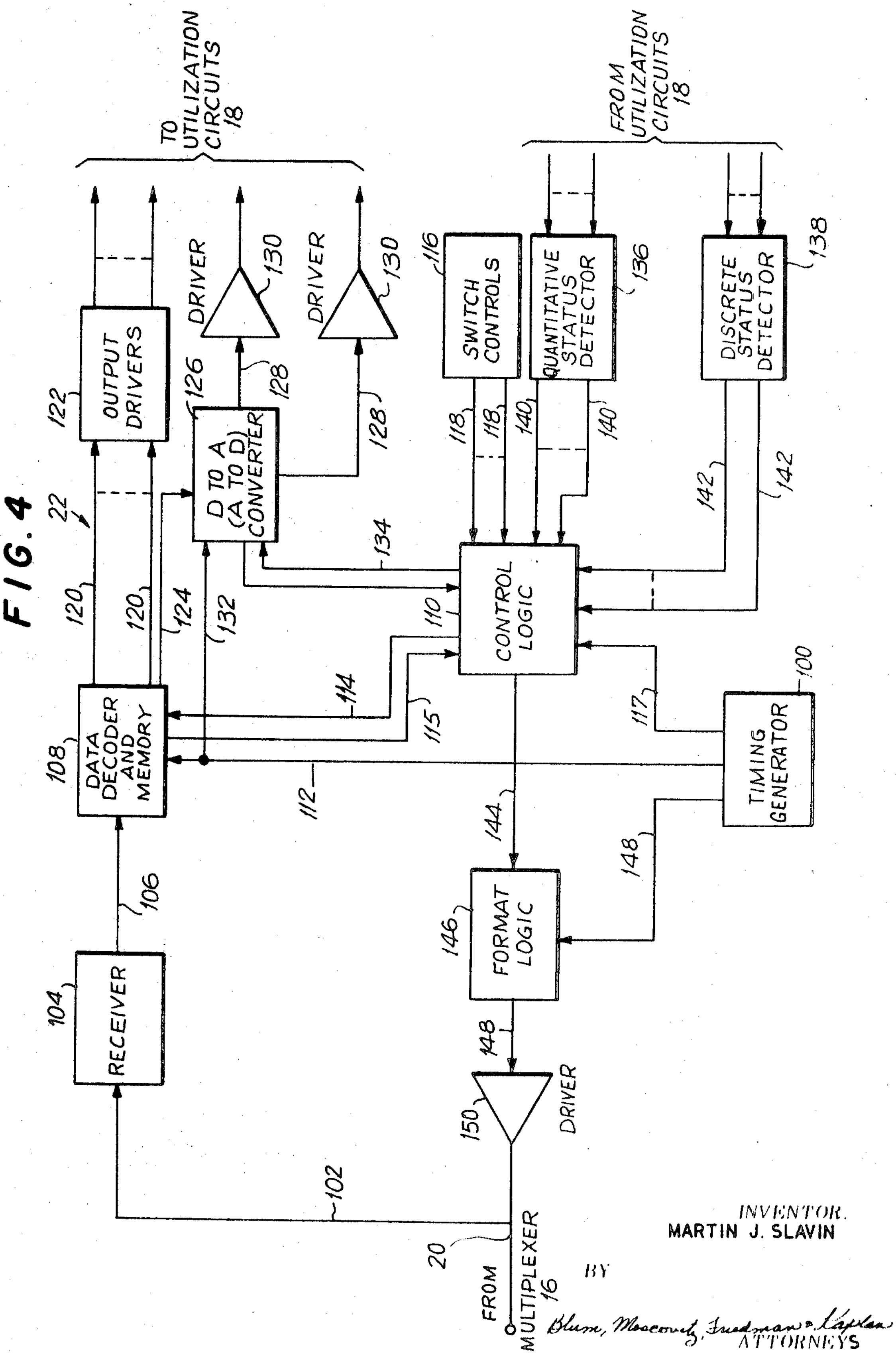
FIG. 4 is a block diagram of the demultiplexer of the system of FIG. 1.

Turning now to FIG. 4, a typical demultiplexer 22 is shown. Said demultiplexer is provided with a timing generator 100 adapted to provide timing signals to the other components thereof. The multiplexed signal from multiplexers 16 is tapped off line 20 by line 102 which passes said signal to receiver 104, which in turn passes said signal along line 106 to data decoder and memory 108. The operation of said data decoder and memory is governed by signals received from timing generator 100 and control logic 110 along lines 112 and 114 respectively. Said control logic is also governed by timing signals passed along line 117 from said timing generator. Switch controls 116, coupled to control logic 110 by lines 118, are provided to adjust said control logic, and therefore each of said demultiplexers, whereby they are adapted to control the particular group of utilization circuits 18 to which they are connected. Thus, switch controls 116 selects particular digital data codes associated with particular utilization circuits to which said demultiplexer is responsive. In this manner, the demultiplexers can be interchangeable among themselves.

If the digital data in the pertinent time frame is associated with a utilization circuit to which the demultiplexer has been connected and to which switch controls 116 have been set, the status digital data contained in said multiplexed signal is stored in the memory portion of data decoder and memory 108. Said memory portion may include core, flip-flop and read-only prewired memories. The core and flip-flop memories are provided to store status data and preferably includes circuitry for the maintenance of such storage in case of a power interruption to permit resetting of utilization circuits 18 after resumption of power. A read-only type memory would be provided where a group of like or different utilization circuits were to be activated in response to a single digital code set on keyboard 26. Such read-only memory would contain programmed data responsive to the input digital code sufficient to control all of the desired utilization circuits.

In the case of discrete control functions such as on and off controls, the output from data decoder and memory 108 is taken along line 120 to output drivers 122 to place the associated utilization circuits 18 in the status directed by the detected multiplexed signal, and therefore the mode of control 14. If some or all of utilization circuits 18 are of the type requiring a continuous adjustment, the output signal from data decoder and memory 108 would be transmitted along line 124 to digital-to-analog converter 126 which converts the digital code transmitted from the multiplexer representative of the setting of adjustment control 34 to an analog signal suitable from transmission along lines 128 to drivers 130. Said drivers each drive the adjustment control of a utilization circuit over a continuous range. Operation of digital-to-analog converter 126 is governed by control logic 110 and timing generator 100 through lines 132 and 134 respectively.

Demultiplexer 22 is also adapted to detect the status of certain utilization circuits and accordingly, a quantitative status detector 136 and a discrete status detector 138 are provided connected to respective utilization circuits. Quantitative status detector 136, which is connected to control logic 110 through lines 140 detects an analog quantitative feature of a utilization circuit such as oxygen pressure, and transmits same to control logic 110 where said analog value is converted to a digital code by means of a digital-to-analog converter of conventional design. In the alternative, said analog signal can be transmitted along line 134 to digital-to-analog converter 126 which can also serve as an analog-to-digital converter. The resultant digital signal would be returned along line 135 to said control logic.

Discrete status detector 138 detects the status of its associated utilization circuits, such as whether they are on or off, and transmits signals representative of such status through lines 142 to control logic 110. Said control logic transmits along line 144 the digital data representative of the detected status, whether discrete or quantitative, of the various utilization circuits to format logic 146, the operation of which is governed by timing generator 100 through line 148. Said format logic structures the digital data into a digital code signal and transmits said signal along line 148 to driver 150 during the appropriate time frame. Said driver impresses the digital code signal on line 20 to carry same to the multiplexers 16.

If desired, transmission of the digital code signal representative of status need not be continuous, but rather, can be in response to activation codes from multiplexer 16 detected by data decoder and memory 108 and passed to control logic 110 along line 115. Such activation code would cause the control logic to transmit the status data on the pertinent utilization circuit. Such status data would preferably be displayed on numerical display 30.

The attendant control panel system according to the invention is extremely flexible in that additional utilization circuits can be added to the system by merely assigning a code to such utilization circuit and connecting same to existing demultiplexers or to an additional demultiplexer. The configuration of control panel 14 shown in FIG. 2 is given by way of example and not by way of limitation, the particular configuration thereof being dictated by the application of the system according to the invention. Thus, keyboard 26 can be replaced by a multipositioned dial, with each position of said dial representing a desired code. Further, embodiments of the arrangement according to the invention can be constructed without incorporating visual display 30 and/or indicator lights 44 and 46.

It will thus be seen that the objects set forth above, among those made apparent from the preceding description are efficiently attained and, since certain changes may be made in the above constructions without departing from the spirit and scope of the invention, it is intended that all matter contained in the above description or shown in the accompanying drawings shall be interpreted as illustrative and not in a limiting sense.

What is claimed is:

1. An attendant control panel system for controlling a plurality of utilization circuits comprising, control means manually adjustable to a plurality of modes each representative of a particular utilization circuit to be controlled and the desired status thereof; multiplexing means connected to said control means for producing a multiplexed signal including in assigned time frames digital codes representative of the mode of said control means, said digital codes being representative of both the utilization circuit to be controlled and the desired status thereof; and a plurality of demultiplexing means each connected with at least a portion of said utilization circuits and said multiplexing means for receiving said multiplexed signal, said demultiplexing means being adapted to detect in an assigned time frame of said multiplexed signal the digital codes assigned to its utilization circuits and, upon detecting such a digital code, to detect the digital code in said signal representative of the desired status of said utilization circuit, to place said utilization circuit in the status indicated by said control means.

2. An attendant control panel system as recited in claim 1, including a plurality of control means, a multiplexing means associated with each of said control means, each of said multiplexing means being connected to all of said demultiplexing means, said plurality of multiplexing means being synchronously operated to each produce its multiplexed signal during a separate assigned time period.

3. An attendant control panel system as recited in claim 1, wherein said control means includes authenticating means manually adjustable to a plurality of modes, said multiplexing means including authentication detecting means for detecting the mode of said authenticating means to permit the transmission of said multiplexed signal only if said detected authenticating means mode corresponds to at least a preselected one of said plurality of modes.

4. An attendant control panel system as recited in claim 1, wherein said control means includes multiple digit keyboard means for setting at least a portion of each mode.

5. An attendant control panel system as recited in claim 4, wherein said control means includes visual display means for displaying indicia representative of the portion of said control panel mode set by said multiple digit keyboard means.

6. An attendant control panel system as recited in claim 1, wherein said control means includes authorizing means connected to said multiplexing means for authorizing the transmission of said multiplexed signal after said control means has been set to the desired mode.

7. An attendant control panel system as recited in claim 1, wherein said control means includes zone selector switch means for establishing at least a part of said control means mode, said zone selector switch means having at least one setting representative of the status of a group of utilization circuits to be simultaneously controlled.

8. An attendant control panel system as recited in claim 7, wherein each of said demultiplexer means associated with utilization circuits in said group is adapted to detect in an assigned time frame of said multiplexed signal the digital code representative of the setting of said zone selector switch means, and upon detecting such a digital code, to place such utilization circuits in the status indicated by said control means.

9. An attendant control panel system as recited in claim 1, wherein at least one of said utilization circuits is adjustable over a continuous range, said control means including adjustment means variable over at least a corresponding range, the setting of said adjustment means being representative of the desired status of said utilization means along said continuous range and forms a part of said control means mode, said multiplexer means multiplexed signal including in the assigned time frame a digital code representative of the setting of said adjustment means, the demultiplexer means associated with said continuously adjustable utilization circuit being adapted to adjust said utilization circuit in response to said adjustment means digital code.

10. An attendant control panel system as recited in claim 1, wherein each of said demultiplexer means includes memory means for storing at least the portion of the last received multiplexed signal associated with each of its utilization circuits, said demultiplexer means being adapted to control the status of its utilization circuits in response to the status of said memory means.

11. An attendant control panel system as recited in claim 1, wherein at least one of said demultiplexing means includes detecting means for producing a digital code signal representative of the status of at least one of said utilization circuits and transmitting means for transmitting to said multiplexing means said digital code signal in assigned time frames, said control means including status indication means for providing an indication of said utilization circuit status, said multiplexing means including receiver means for detecting said digital code signal and operating said status indicating means in response thereto.

12. An attendant control panel system as recited in claim 11, wherein said detecting means digital code signal is representative of a quantitative characteristic of said utilization circuit, said status indication means being variably adjustable by said receiver means to provide an indication of said utilization circuit quantitative characteristic.

13. An attendant control panel system as recited in claim 12, wherein said status indication means includes a visual display means for providing a visual indication of utilization circuit status.

14. An attendant control panel system as recited in claim 13, wherein at least one mode of said control means is representative of a command to detect the status of a utilization circuit, the demultiplexer means associated with said utilization circuit, upon detecting in an assigned time frame the digital code representative of said detection command, activating said transmitting means to transmit said digital code signal representative of the status of said utilization circuit, said receiver means operating said visual display means in response to said digital code signal.

15. An attendant control panel system as recited in claim 1, wherein one of said control means modes is representative of at least a portion of said utilization circuits and of the respective status thereof, said demultiplexer means associated with said portion of said utilization circuits, upon detecting the digital code associated with said one control means mode, placing said portion of said utilization circuits in the status indicated by said control means.

16. An attendant control panel system as recited in claim 1, wherein at least one of said control means modes is representative of a group of said utilization circuits and of the respective status thereof, said multiplexer means producing a multiplexed signal including in the assigned time frame a digital code representative of said control means mode, at least one of the demultiplexer means associated with utilization circuits in said group of utilization circuits including memory means for storing data identifying such utilization circuits and the status in which they are to be placed in response to said digital code, said demultiplexer means, upon detecting said digital code, utilizing said stored data to place said group of utilization circuits in the status indicated by said control means.